(12) United States Patent
Yezek

(10) Patent No.: US 11,248,122 B2
(45) Date of Patent: Feb. 15, 2022

(54) PIGMENTS FOR ELECTROPHORETIC DISPLAYS

(71) Applicant: E Ink Corporation, Billerica, MA (US)

(72) Inventor: Lee Yezek, Watertown, MA (US)

(73) Assignee: E Ink Corporation, Billerica, MA (US)

( * ) Notice: Subject to any disclaimer, the term of this patent is extended or adjusted under 35 U.S.C. 154(b) by 331 days.

(21) Appl. No.: 16/234,363

(22) Filed: Dec. 27, 2018

(65) Prior Publication Data

US 2019/0203051 A1 Jul. 4, 2019

Related U.S. Application Data

(60) Provisional application No. 62/612,385, filed on Dec. 30, 2017.

(51) Int. Cl.
| | |
|---|---|
| *C09B 48/00* | (2006.01) |
| *G02F 1/167* | (2019.01) |
| *C08G 77/388* | (2006.01) |
| *G02F 1/1675* | (2019.01) |
| *C09B 69/00* | (2006.01) |
| *C08L 83/08* | (2006.01) |
| *C09B 67/00* | (2006.01) |
| *C09B 67/20* | (2006.01) |
| *C08G 77/00* | (2006.01) |

(52) U.S. Cl.
CPC ............ *C09B 48/00* (2013.01); *C08G 77/388* (2013.01); *C08L 83/08* (2013.01); *C09B 67/0063* (2013.01); *C09B 68/41* (2013.01); *C09B 69/008* (2013.01); *G02F 1/167* (2013.01); *G02F 1/1675* (2019.01); *C08G 77/70* (2013.01); *G02F 2001/1678* (2013.01)

(58) Field of Classification Search
CPC ........ C09B 48/00; C08G 77/26; C08G 77/388
See application file for complete search history.

(56) References Cited

U.S. PATENT DOCUMENTS

| | | | |
|---|---|---|---|
| 4,418,346 A | 11/1983 | Batchelder | |
| 5,725,651 A | 3/1998 | Zambounis et al. | |
| 5,872,552 A | 2/1999 | Gordon, II et al. | |
| 5,961,804 A | 10/1999 | Jacobson et al. | |
| 6,017,584 A | 1/2000 | Albert et al. | |
| 6,120,588 A | 9/2000 | Jacobson | |
| 6,120,839 A | 9/2000 | Comiskey et al. | |
| 6,130,774 A | 10/2000 | Albert et al. | |
| 6,144,361 A | 11/2000 | Gordon, II et al. | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,323,989 B1 | 11/2001 | Jacobson et al. | |
| 6,377,387 B1 | 4/2002 | Duthaler et al. | |
| 6,515,649 B1 | 2/2003 | Albert et al. | |
| 6,538,801 B2 | 3/2003 | Jacobson | |
| 6,545,797 B2 | 4/2003 | Chen et al. | |
| 6,580,545 B2 | 6/2003 | Morrison et al. | |
| 6,652,075 B2 | 11/2003 | Jacobson | |
| 6,664,944 B1 | 12/2003 | Albert et al. | |
| 6,693,620 B1 | 2/2004 | Herb et al. | |
| 6,721,083 B2 | 4/2004 | Jacobson et al. | |
| 6,727,873 B2 | 4/2004 | Gordon, II et al. | |
| 6,727,881 B1 | 4/2004 | Albert et al. | |
| 6,788,452 B2 | 9/2004 | Liang et al. | |
| 6,822,782 B2 | 11/2004 | Honeyman et al. | |
| 6,831,771 B2 | 12/2004 | Ho et al. | |
| 6,864,875 B2 | 3/2005 | Drzaic et al. | |
| 6,866,760 B2 | 3/2005 | Paolini, Jr. et al. | |
| 6,870,661 B2 | 3/2005 | Pullen et al. | |
| 6,914,713 B2 | 7/2005 | Chung et al. | |
| 6,914,714 B2 | 7/2005 | Chen et al. | |
| 6,922,276 B2 | 7/2005 | Zhang et al. | |
| 6,927,892 B2 | 8/2005 | Ho et al. | |
| 6,956,690 B2 | 10/2005 | Yu et al. | |
| 6,958,849 B2 | 10/2005 | Chen et al. | |
| 6,972,893 B2 | 12/2005 | Chen et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,038,655 B2 | 5/2006 | Herb et al. | |
| 7,038,656 B2 | 5/2006 | Liang et al. | |
| 7,038,670 B2 | 5/2006 | Liang et al. | |
| 7,046,228 B2 | 5/2006 | Liang et al. | |
| 7,052,571 B2 | 5/2006 | Wang et al. | |
| 7,052,766 B2 | 5/2006 | Zang et al. | |
| 7,072,095 B2 | 7/2006 | Liang et al. | |
| 7,075,502 B1 | 7/2006 | Drzaic et al. | |
| 7,110,162 B2 | 9/2006 | Wu et al. | |
| 7,113,323 B2 | 9/2006 | Ho et al. | |
| 7,116,318 B2 | 10/2006 | Amundson et al. | |
| 7,141,688 B2 | 11/2006 | Feng et al. | |
| 7,142,351 B2 | 11/2006 | Chung et al. | |
| 7,144,942 B2 | 12/2006 | Zang et al. | |

(Continued)

FOREIGN PATENT DOCUMENTS

| | | |
|---|---|---|
| CN | 104141249 A | 11/2014 |
| JP | 2003096191 A | 4/2003 |
| JP | 2004339267 A | 12/2004 |
| JP | 2013186179 A | 9/2013 |

OTHER PUBLICATIONS

Machine translation of JP 2003-096191 (no date).*

(Continued)

*Primary Examiner* — Marc S Zimmer
(74) *Attorney, Agent, or Firm* — Ioannis Constantinides

(57) ABSTRACT

A polysiloxane-substituted quinacridone pigment is produced by a quinacridone pigment with an epoxy-terminated polysiloxane under conditions effective to cause the epoxy group on the polysiloxane to react with, and bond the polysiloxane to, the quinacridone pigment. The quinacridone pigment thus produced has the polysiloxane grouping bonded to one of the quinacridone nitrogen atoms via a hydrocarbon linking group, which bears a hydroxyl group on a carbon atom α or β to the quinacridone nitrogen atom. These quinacridone pigments are useful in electrophoretic displays.

9 Claims, 5 Drawing Sheets

(56) References Cited

U.S. PATENT DOCUMENTS

| | | |
|---|---|---|
| 7,167,155 B1 | 1/2007 | Albert et al. |
| 7,170,670 B2 | 1/2007 | Webber |
| 7,180,649 B2 | 2/2007 | Morrison et al. |
| 7,226,550 B2 | 6/2007 | Hou et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,247,379 B2 | 7/2007 | Pullen et al. |
| 7,277,218 B2 | 10/2007 | Hwang et al. |
| 7,286,279 B2 | 10/2007 | Yu et al. |
| 7,312,784 B2 | 12/2007 | Baucom et al. |
| 7,312,916 B2 | 12/2007 | Pullen et al. |
| 7,321,459 B2 | 1/2008 | Masuda et al. |
| 7,339,715 B2 | 3/2008 | Webber et al. |
| 7,375,875 B2 | 5/2008 | Whitesides et al. |
| 7,382,514 B2 | 6/2008 | Hsu et al. |
| 7,385,751 B2 | 6/2008 | Chen et al. |
| 7,390,901 B2 | 6/2008 | Yang et al. |
| 7,411,719 B2 | 8/2008 | Paolini, Jr. et al. |
| 7,411,720 B2 | 8/2008 | Honeyman et al. |
| 7,453,445 B2 | 11/2008 | Amundson |
| 7,473,782 B2 | 1/2009 | Yang et al. |
| 7,492,505 B2 | 2/2009 | Liang et al. |
| 7,532,388 B2 | 5/2009 | Whitesides et al. |
| 7,532,389 B2 | 5/2009 | Li et al. |
| 7,535,624 B2 | 5/2009 | Amundson et al. |
| 7,572,394 B2 | 8/2009 | Gu et al. |
| 7,576,904 B2 | 8/2009 | Chung et al. |
| 7,580,180 B2 | 8/2009 | Ho et al. |
| 7,667,684 B2 | 2/2010 | Jacobson et al. |
| 7,679,814 B2 | 3/2010 | Paolini, Jr. et al. |
| 7,684,108 B2 | 3/2010 | Wang et al. |
| 7,715,088 B2 | 5/2010 | Liang et al. |
| 7,746,544 B2 | 6/2010 | Comiskey et al. |
| 7,767,112 B2 | 8/2010 | Hou et al. |
| 7,791,789 B2 | 9/2010 | Albert et al. |
| 7,800,813 B2 | 9/2010 | Wu et al. |
| 7,821,702 B2 | 10/2010 | Liang et al. |
| 7,839,564 B2 | 11/2010 | Whitesides et al. |
| 7,848,006 B2 | 12/2010 | Wilcox et al. |
| 7,903,319 B2 | 3/2011 | Honeyman et al. |
| 7,910,175 B2 | 3/2011 | Webber |
| 7,951,938 B2 | 5/2011 | Yang et al. |
| 7,952,790 B2 | 5/2011 | Honeyman et al. |
| 7,956,841 B2 | 6/2011 | Albert et al. |
| 7,982,941 B2 | 7/2011 | Lin et al. |
| 8,009,348 B2 | 8/2011 | Zehner et al. |
| 8,018,640 B2 | 9/2011 | Whitesides et al. |
| 8,031,392 B2 | 10/2011 | Hiji et al. |
| 8,040,594 B2 | 10/2011 | Paolini, Jr. et al. |
| 8,054,526 B2 | 11/2011 | Bouchard |
| 8,098,418 B2 | 1/2012 | Paolini, Jr. et al. |
| 8,115,729 B2 | 2/2012 | Danner et al. |
| 8,159,636 B2 | 4/2012 | Sun et al. |
| 8,199,395 B2 | 6/2012 | Whitesides et al. |
| 8,213,076 B2 | 7/2012 | Albert et al. |
| 8,257,614 B2 | 9/2012 | Gu et al. |
| 8,270,063 B2 * | 9/2012 | Fontana .................. G02F 1/167 359/296 |
| 8,270,064 B2 | 9/2012 | Feick et al. |
| 8,305,341 B2 | 11/2012 | Arango et al. |
| 8,361,620 B2 | 1/2013 | Zang et al. |
| 8,363,299 B2 | 1/2013 | Paolini, Jr. et al. |
| 8,363,306 B2 | 1/2013 | Du et al. |
| 8,390,918 B2 | 3/2013 | Wilcox et al. |
| 8,422,116 B2 | 4/2013 | Sprague et al. |
| 8,441,714 B2 | 5/2013 | Paolini, Jr. et al. |
| 8,441,716 B2 | 5/2013 | Paolini, Jr. et al. |
| 8,466,852 B2 | 6/2013 | Drzaic et al. |
| 8,503,063 B2 | 8/2013 | Sprague |
| 8,576,470 B2 | 11/2013 | Paolini, Jr. et al. |
| 8,576,475 B2 | 11/2013 | Huang et al. |
| 8,576,476 B2 | 11/2013 | Telfer et al. |
| 8,582,196 B2 | 11/2013 | Walls et al. |
| 8,593,718 B2 | 11/2013 | Comiskey et al. |
| 8,593,721 B2 | 11/2013 | Albert et al. |
| 8,605,354 B2 | 12/2013 | Zhang et al. |
| 8,649,084 B2 | 2/2014 | Wang et al. |
| 8,654,436 B1 | 2/2014 | Feick |
| 8,670,174 B2 | 3/2014 | Sprague et al. |
| 8,704,756 B2 | 4/2014 | Lin |
| 8,717,664 B2 | 5/2014 | Wang et al. |
| 8,786,935 B2 | 7/2014 | Sprague |
| 8,797,634 B2 | 8/2014 | Paolini, Jr. et al. |
| 8,810,899 B2 | 8/2014 | Sprague et al. |
| 8,822,782 B1 | 9/2014 | Cunnyngham et al. |
| 8,830,559 B2 | 9/2014 | Honeyman et al. |
| 8,873,129 B2 | 10/2014 | Paolini, Jr. et al. |
| 8,902,153 B2 | 12/2014 | Bouchard et al. |
| 8,902,491 B2 | 12/2014 | Wang et al. |
| 8,917,439 B2 | 12/2014 | Wang et al. |
| 8,961,831 B2 | 2/2015 | Du et al. |
| 8,964,282 B2 | 2/2015 | Wang et al. |
| 9,013,783 B2 | 4/2015 | Sprague |
| 9,052,564 B2 | 6/2015 | Sprague et al. |
| 9,114,663 B2 | 8/2015 | Ho et al. |
| 9,116,412 B2 | 8/2015 | Lin |
| 9,146,439 B2 | 9/2015 | Zhang |
| 9,158,174 B2 | 10/2015 | Walls et al. |
| 9,164,207 B2 | 10/2015 | Honeyman et al. |
| 9,170,467 B2 | 10/2015 | Whitesides et al. |
| 9,170,468 B2 | 10/2015 | Lin et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,268,191 B2 | 2/2016 | Paolini, Jr. et al. |
| 9,279,906 B2 | 3/2016 | Kang |
| 9,285,649 B2 | 3/2016 | Du et al. |
| 9,293,511 B2 | 3/2016 | Jacobson et al. |
| 9,341,915 B2 | 5/2016 | Yang et al. |
| 9,341,916 B2 | 5/2016 | Telfer et al. |
| 9,348,193 B2 | 5/2016 | Hiji et al. |
| 9,360,733 B2 | 6/2016 | Wang et al. |
| 9,361,836 B1 | 6/2016 | Telfer et al. |
| 9,366,935 B2 | 6/2016 | Du et al. |
| 9,372,380 B2 | 6/2016 | Du et al. |
| 9,382,427 B2 | 7/2016 | Du et al. |
| 9,383,623 B2 | 7/2016 | Lin et al. |
| 9,423,666 B2 | 8/2016 | Wang et al. |
| 9,428,649 B2 | 8/2016 | Li et al. |
| 9,459,510 B2 | 10/2016 | Lin |
| 9,513,527 B2 | 12/2016 | Chan et al. |
| 9,541,814 B2 | 1/2017 | Lin et al. |
| 9,557,623 B2 | 1/2017 | Wang et al. |
| 9,664,978 B2 | 5/2017 | Arango et al. |
| 9,670,367 B2 | 6/2017 | Li et al. |
| 9,671,668 B2 | 6/2017 | Chan et al. |
| 9,688,859 B2 | 6/2017 | Yezek et al. |
| 9,697,778 B2 | 7/2017 | Telfer |
| 9,726,957 B2 | 8/2017 | Telfer et al. |
| 9,740,076 B2 | 8/2017 | Paolini et al. |
| 9,752,034 B2 | 9/2017 | Wu et al. |
| 9,759,980 B2 | 9/2017 | Du et al. |
| 9,778,537 B2 | 10/2017 | Wang et al. |
| 9,812,073 B2 | 11/2017 | Lin et al. |
| 9,835,926 B2 | 12/2017 | Sprague et al. |
| 9,921,451 B2 | 3/2018 | Telfer et al. |
| 9,922,603 B2 | 3/2018 | Lin |
| 2003/0048522 A1 | 3/2003 | Liang et al. |
| 2003/0151029 A1 | 8/2003 | Hsu et al. |
| 2003/0164480 A1 | 9/2003 | Wu et al. |
| 2004/0030125 A1 | 2/2004 | Li et al. |
| 2005/0012980 A1 | 1/2005 | Wilcox et al. |
| 2008/0043318 A1 | 2/2008 | Whitesides et al. |
| 2008/0048970 A1 | 2/2008 | Drzaic et al. |
| 2009/0009852 A1 | 1/2009 | Honeyman et al. |
| 2009/0206499 A1 | 8/2009 | Whitesides |
| 2009/0225398 A1 | 9/2009 | Duthaler et al. |
| 2010/0060628 A1 | 3/2010 | Lenssen et al. |
| 2010/0148385 A1 | 6/2010 | Balko et al. |
| 2010/0156780 A1 | 6/2010 | Jacobson et al. |
| 2011/0043543 A1 | 2/2011 | Chen et al. |
| 2011/0217639 A1 | 9/2011 | Sprague |

(56) References Cited

U.S. PATENT DOCUMENTS

| | | |
|---|---|---|
| 2012/0049125 A1 | 3/2012 | Du et al. |
| 2012/0326957 A1 | 12/2012 | Drzaic et al. |
| 2013/0161565 A1 | 6/2013 | Laxton |
| 2013/0193385 A1 | 8/2013 | Li et al. |
| 2013/0242378 A1 | 9/2013 | Paolini, Jr. et al. |
| 2013/0244149 A1 | 9/2013 | Wang et al. |
| 2013/0278995 A1 | 10/2013 | Drzaic et al. |
| 2014/0011913 A1 | 1/2014 | Du et al. |
| 2014/0055840 A1 | 2/2014 | Zang et al. |
| 2014/0078024 A1 | 3/2014 | Paolini, Jr. et al. |
| 2014/0078573 A1 | 3/2014 | Comiskey et al. |
| 2014/0078576 A1 | 3/2014 | Sprague |
| 2014/0078857 A1 | 3/2014 | Nelson et al. |
| 2014/0104674 A1 | 4/2014 | Ting et al. |
| 2014/0231728 A1 | 8/2014 | Du et al. |
| 2014/0347718 A1 | 11/2014 | Duthaler et al. |
| 2014/0362213 A1 | 12/2014 | Tseng |
| 2015/0097877 A1 | 4/2015 | Lin et al. |
| 2015/0103394 A1 | 4/2015 | Wang et al. |
| 2015/0118390 A1 | 4/2015 | Rosenfeld et al. |
| 2015/0118494 A1 | 4/2015 | Vilner et al. |
| 2015/0124345 A1 | 5/2015 | Rosenfeld et al. |
| 2015/0177590 A1 | 6/2015 | Laxton |
| 2015/0185509 A1 | 7/2015 | Wang et al. |
| 2015/0241754 A1 | 8/2015 | Du et al. |
| 2015/0268531 A1 | 9/2015 | Wang et al. |
| 2015/0301246 A1 | 10/2015 | Zang et al. |
| 2015/0301425 A1 | 10/2015 | Du et al. |
| 2016/0026062 A1 | 1/2016 | Zhang |
| 2016/0048054 A1 | 2/2016 | Danner |
| 2016/0170106 A1 | 6/2016 | Wang et al. |
| 2017/0184939 A1 | 6/2017 | Nakazawa et al. |
| 2017/0287377 A1* | 10/2017 | Telfer ..................... G02F 1/167 |

OTHER PUBLICATIONS

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Heikenfeld, J. et al., "A critical review of the present and future prospects for electronic paper", SID, 19(2), pp. 129-156 (2011). Dec. 31, 2011.

Wang, J. et al., "Alkyl and Dendron Substituted Quinacridones: Synthesis, Structures and Luminescent Properties", J. Phys. Chem. B, 111, pp. 5082-5089 (2007). Apr. 18, 2007.

European Patent Office, EP Appl. No 18894051.4, Extended European Search Report, dated Mar. 2, 2021.

Korean Intellectual Property Office, PCT/US2018/067782, International Search Report and Written Opinion, dated Apr. 23, 2019.

\* cited by examiner

Ex. 2, 3%

PIGMENTS FOR ELECTROPHORETIC DISPLAYS

REFERENCE TO RELATED APPLICATIONS

This application claims benefit of provisional Application Ser. No. 62/612,385, filed Dec. 30, 2017.

This application is related to:
(a) U.S. Pat. Nos. 6,822,782 and 7,411,720;
(b) U.S. Pat. No. 9,752,034;
(c) U.S. Pat. No. 9,697,778; and
(d) U.S. Pat. No. 9,921,451.

The entire contents of these patents and copending application, and of all other U.S. patents and published and copending applications mentioned below, are herein incorporated by reference.

BACKGROUND OF INVENTION

This invention relates to pigments for use in electrophoretic displays, and to electrophoretic media and displays containing such pigments. The pigments of the present invention are especially, although not exclusively, intended for use in electrophoretic displays capable of rendering more than two colors using a single layer of electrophoretic medium comprising a plurality of colored particles.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC. and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. [[Hereinafter, the term "microcavity electrophoretic display" may be used to cover both encapsulated and microcell electrophoretic displays.]] The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,831,771; 6,870,661; 6,927,892; 6,956,690; 6,958,849; 7,002,728; 7,038,655; 7,052,766; 7,110,162; 7,113,323; 7,141,688; 7,142,351; 7,170,670; 7,180,649; 7,226,550; 7,230,750; 7,230,751; 7,236,290; 7,247,379; 7,277,218; 7,286,279; 7,312,916; 7,375,875; 7,382,514; 7,390,901; 7,411,720; 7,473,782; 7,532,388; 7,532,389; 7,572,394; 7,576,904; 7,580,180; 7,679,814; 7,746,544; 7,767,112; 7,848,006; 7,903,319; 7,951,938; 8,018,640; 8,115,729; 8,199,395; 8,257,614; 8,270,064; 8,305,341; 8,361,620; 8,363,306; 8,390,918; 8,582,196; 8,593,718; 8,654,436; 8,902,491; 8,961,831; 9,052,564; 9,114,663; 9,158,174; 9,341,915; 9,348,193; 9,361,836; 9,366,935; 9,372,380; 9,382,427; and 9,423,666; and U.S. Patent Applications Publication Nos. 2003/0048522; 2003/0151029; 2003/0164480; 2003/0169227; 2003/0197916; 2004/0030125; 2005/0012980; 2005/0136347; 2006/0132896; 2006/

0281924; 2007/0268567; 2009/0009852; 2009/0206499; 2009/0225398; 2010/0148385; 2011/0217639; 2012/0049125; 2012/0112131; 2013/0161565; 2013/0193385; 2013/0244149; 2014/0011913; 2014/0078024; 2014/0078573; 2014/0078576; 2014/0078857; 2014/0104674; 2014/0231728; 2014/0339481; 2014/0347718; 2015/0015932; 2015/0177589; 2015/0177590; 2015/0185509; 2015/0218384; 2015/0241754; 2015/0248045; 2015/0301425; 2015/0378236; 2016/0139483; and 2016/0170106;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 7,012,600 and 7,453,445; and (i) Applications of displays; see for example U.S. Pat. Nos. 7,312,784 and 8,009,348.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colors are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

Multilayer, stacked electrophoretic displays are known in the art; see, for example, J. Heikenfeld, P. Drzaic, J-S Yeo and T. Koch, Journal of the SID, 19(2), 2011, pp. 129-156. In such displays, ambient light passes through images in each of the three subtractive primary colors, in precise analogy with conventional color printing. U.S. Pat. No. 6,727,873 describes a stacked electrophoretic display in which three layers of switchable cells are placed over a reflective background. Similar displays are known in which colored particles are moved laterally (see International Application No. WO 2008/065605) or, using a combination of vertical and lateral motion, sequestered into micropits. In both cases, each layer is provided with electrodes that serve to concentrate or disperse the colored particles on a pixel-by-pixel basis, so that each of the three layers requires a layer of thin-film transistors (TFT's) (two of the three layers of TFT's must be substantially transparent) and a light-transmissive counter-electrode. Such a complex arrangement of electrodes is costly to manufacture, and in the present state of the art it is difficult to provide an adequately transparent plane of pixel electrodes, especially as the white state of the display must be viewed through several layers of electrodes. Multi-layer displays also suffer from parallax problems as the thickness of the display stack approaches or exceeds the pixel size.

U.S. Pat. Nos. 8,576,476 and 8,797,634 describe multi-color electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Multi-color electrophoretic displays comprising only a single layer of electrophoretic medium containing from three to six different types of particles have been described in the art; see, for example, US 2015/0103394; US 2015/0097877; US 2016/0085132; US 2016/0140909; US 2016/0275874; and U.S. Pat. Nos. 8,031,392; 8,717,664; 9,170,468; 9,285,649; 9,513,527; 9,514,814; and 9,671,668. Most if not all these single layer displays depend for their operation upon close control of the interactions between the various types of particles so that the electro-optic response of the medium to an applied electric field varies with the magnitude of the electric field as well as its polarity. For example, in the display shown in FIG. 2 of U.S. Pat. No. 8,717,664, a driving voltage of +15V produces a black color, whereas a driving voltage of +5V produces a red color.

Obviously, in this type of multi-color display, it is highly unlikely that one will be able to find a set of particles having all the desired colors and particle interactions, and in practice it is normally necessary to provide some type of coating, typically a polymeric coating, on at least some of the particles to control the particle interactions. There is of course an extensive literature on coating electrophoretic particles with polymers. The aforementioned U.S. Pat. No. 6,822,782 (which is primarily concerned with monochrome displays) describes an electrophoretic medium comprising a plurality of pigment particles suspended in a suspending fluid, the pigment particles having from about 1 to about 15 percent by weight of the pigment of a polymer chemically bonded to, or cross-linked around, the pigment particles.

U.S. Pat. No. 9,688,859 describes a process for treatment of pigment particles having surfaces bearing nucleophilic groups; the pigment particles are contacted with a reagent having a polymerizable or polymerization-initiating group, and at least one electrophilic group under conditions which cause the electrophilic groups to react with the nucleophilic groups on the particle surfaces, thus attaching the polymerizable or polymerization-initiating group to the particle surface. The polymerizable or polymerization-initiating group is then used to form a polymer attached to pigment particle. Among the pigments so treated are dimethylquinacridone pigments.

U.S. Pat. No. 5,725,651 describes N-alkylated quinacridone pigments with primary alkyl chains ranging from 1 to 18 carbons in length, and a process for producing such quinacridone pigments by subjecting a quinacridone to an N-deprotonation reaction followed by an alkylation. Alkylation of quinacridones is also described in "Alkyl and Dendron Substituted Quinacridones: Synthesis, Structures, and Luminescent Properties" *J. Phys. Chem. B* 2007, 111, 5082-5089.

The aforementioned U.S. Pat. No. 9,752,034 describes quinacridone pigments that are surface-functionalized with glycidyl methacrylate, maleic anhydride, or 4-methacryloxyethyl trimellitic anhydride to create a functionalized pigment. The functional groups are then activated to bond hydrophobic polymers, thereby coating the pigment with the hydrophobic polymers.

The various processes for producing polymer-coated pigments described in the four preceding paragraphs all require at least a two step synthesis; in most cases, the first step introduces a polymerizable or polymerization-initiating group on to the pigment, while the second step creates a polymeric chain from the polymerizable or polymerization-initiating group. Furthermore, since many polymer-forming steps give rise to polymer chains the length of which vary greatly with reaction conditions and/or between different polymer particles, the lengths of the polymer chains are likely to vary substantially. If copolymer chains are formed, the chemical composition of individual chains may also vary substantially. Such variations in polymer chains may affect both the particle-particle interactions and the interactions between the particles and the fluid, and either effect may cause variations in the electro-optic response of the particles and consequently of the display.

The present invention provides a single step process for attaching a polymer chain to a pigment particle. Provided a monodisperse pigment chain is used, polymer coatings with a narrow molecular weight distribution can be obtained.

SUMMARY OF INVENTION

Accordingly, this invention provides a process for producing a polysiloxane-substituted quinacridone pigment, which process comprises reacting the quinacridone pigment with an epoxy-terminated polysiloxane under conditions effective to cause the epoxy group on the polysiloxane to react with, and bond the polysiloxane to, the quinacridone pigment.

In this process, the polysiloxane may be a polydimethylsiloxane or other polydialkylsiloxane. The polysiloxane chain may have a molecular weight in the range of about 3000 to about 30,000. The epoxy group may form part of an epoxyalkyl ether grouping or an epoxycycloalkyl grouping. Specific preferred epoxy-terminated polysiloxanes include mono-(2,3-expoxy)propylether terminated polydimethylsiloxane, asymmetric, of the formula:

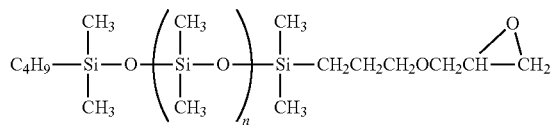

(available commercially as Gelest MCR-E21 from Gelest, Inc., 1 Progress Drive, Morrisville Pa. 19067) and [2-3% (epoxycyclohexylethyl)methylsiloxane]-dimethylsiloxane copolymer:

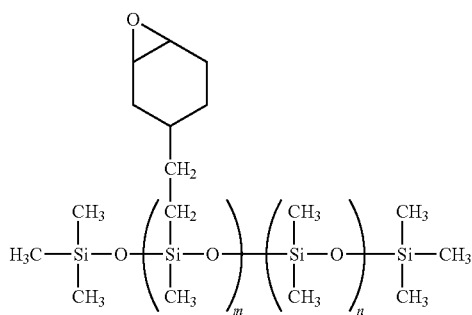

(available commercially as Gelest ECMS-227).

The quinacridone pigments used in the process of the present invention may be, for example of Formula I below:

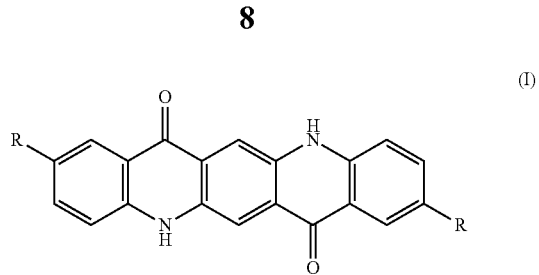

wherein each R independently is a hydrogen, $C_1$-$C_3$ alkyl group, or a halogen. Preferably both groups R are methyl groups. Other quinacridones may also be treated using the techniques described herein. One specific preferred quinacridone material for use in the present process is a pre-milled combination of Pigment Violet 19 (CAS # 1047-16-1) and Pigment Red 122 (CAS # 980-26-7) commercially available from Clariant (Basel, Switzerland) as Ink Jet Magenta E 02 VP2621.

It will be appreciated that, in the process of the present invention, the epoxy ring on the polysiloxane may open in two directions. Typically, there is little energy difference in the two possible reactions, so that the product obtained is a mixture of two isomers, one with a hydroxyl group $\alpha$ to the quinacridone nitrogen and the other with the hydroxyl group $\beta$ to the quinacridone nitrogen. The pigments of the present invention are primarily intended for use in electrophoretic displays, and in this application use of the mixture of isomers is satisfactory, since the primary function of the polysiloxane grouping is to assist the dispersion of the quinacridone pigment in the non-aqueous hydrophobic fluids (typically light hydrocarbons of about 6 to 8 carbon atoms) used in most commercial electrophoretic displays, and for this purpose the exact form of the linking group and its hydroxyl substituent is largely irrelevant. Should it be necessary to separate the isomers for other uses, those skilled in the synthesis of quinacridone pigments will be aware of conventional techniques, such as preparative chromatography, which may be used to separate the isomers.

This invention also extends to a polysiloxane-substituted quinacridone pigment in which a polysiloxane grouping is bonded to one of the quinacridone nitrogen atoms via a hydrocarbon linking group, the hydrocarbon linking group bearing a hydroxyl group on a carbon atom $\alpha$ or $\beta$ to the quinacridone nitrogen atom. Preferred polysiloxane-substituted quinacridone pigments of this type are those represented by the formula:

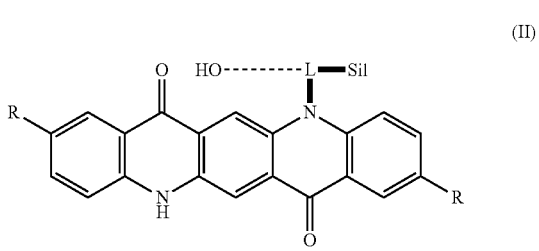

where L is a hydrocarbon linking group, Sil is a polysiloxane grouping and the broken line indicated that the hydroxyl substituent is attached to a carbon atom $\alpha$ or $\beta$ to the quinacridone nitrogen atom.

This invention also extends to an electrophoretic medium comprising particles of a pigment of the present invention, or produced by the process of the present invention, dispersed in a fluid. Such an electrophoretic medium may comprise at least two other types of pigment particles in addition to the particles of the pigment of the present invention, the three types of particles having colors differing from each other. The electrophoretic medium may be of the type described in the aforementioned US 2016/0085132 and comprise, in addition to the fluid, (a) a plurality of first and a plurality of second particles dispersed in the fluid the first and second particles bearing charges of opposite polarity, the first particle being a light-scattering particle and the second particle having one of the subtractive primary colors; and (b) a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth types of particles is greater than that required to separate an aggregate formed from any other two types of particles.

Alternatively, the electrophoretic medium may comprise, in addition to the fluid:

(a) a plurality of first and a plurality of fourth particles dispersed in the fluid the first and fourth particles bearing charges of opposite polarity and each having a polymer coating comprising at least about 60 percent by weight of an acrylate or methacrylate ester monomer wherein the ester group comprises a hydrocarbon chain comprising at least about six carbon atoms, one of the first and fourth particles being a light-scattering particle and the other of the first and fourth particles being a substantially non-light-scattering particle having one of the subtractive primary colors;

(b) a plurality of second particles dispersed in the fluid, the second particles bearing charges of the same polarity as the fourth particles, having a polymer coating comprising at least about 60 percent by weight of a polydimethylsiloxane-containing monomer, and having a subtractive primary color different from the substantially non-light-scattering one of the first and fourth particles, the second particles being pigment particles of the present invention; and (c) a plurality of third particles bearing charges of the same polarity as the first particles, being substantially non-light scattering and having a subtractive primary color different from the substantially non-light-scattering one of the first and fourth particles and different from that of the second particles.

This invention also provides an electrophoretic display comprising a layer of an electrophoretic medium of the invention and at least one electrode disposed adjacent the layer of electrophoretic medium and arranged to apply an electric field thereto.

DETAILED DESCRIPTION

Figure 1:
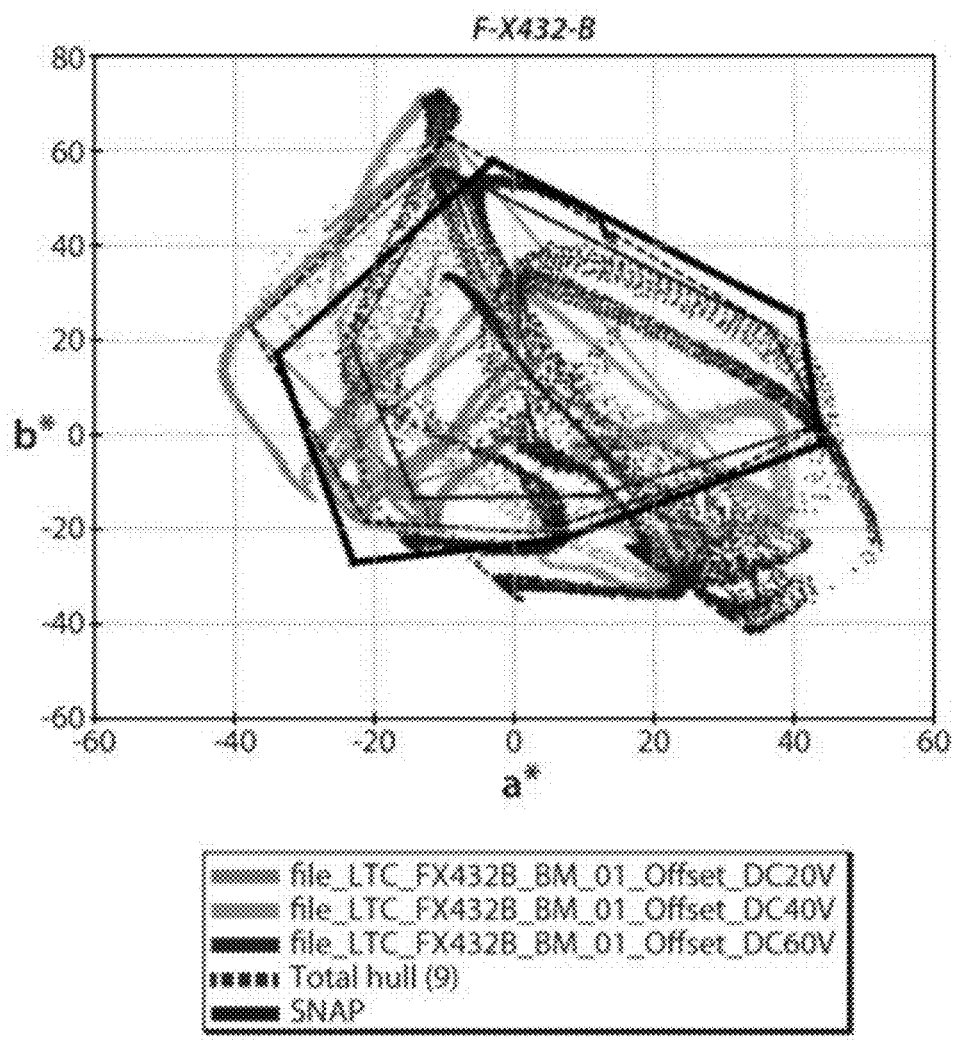
FIGS. 1-5 of the accompanying drawings are color maps of the a*b* plane (in the conventional L*a*b* color space) showing the colors obtainable from various full color electrophoretic media of the present invention and similar prior art media, as described in the Examples below.

As indicated above, the present invention provides a process for producing a polysiloxane-substituted quinacridone pigment, which process comprises reacting the quinacridone pigment with a epoxy-terminated polysiloxane under conditions effective to cause the epoxy group on the polysiloxane to react with, and bond the polysiloxane to, the quinacridone pigment, and the pigments so produced, and electrophoretic media and displays using these pigments.

Also as noted above, multi-color electrophoretic displays comprising only a single layer of electrophoretic medium often depend for their operation upon close control of the interactions between the various types of particles. In particular, the electrophoretic medium described in the aforementioned US 2016/0085132 typically requires one particle (disclosed as the magenta particle) which has a polymer coating sufficient to enable the particle to be readily dispersed in the hydrocarbon fluids typically used in practical electrophoretic media but in which the polymeric layer is sufficiently sparse and the polymer chains themselves of sufficiently modest molecular weight to yield loosely flocculated dispersions in such hydrocarbon solvents in the absence of an added charge control agent (CCA). Such loosely flocculated hydrocarbon dispersions have a high viscosity with a consistency resembling that of tomato bisque. If one attempts to synthesize such pigments via prior art processes involving first attaching a polymerizable or polymerization-initiating group to the pigment particle and then effecting polymerization at the site of the polymerizable or polymerization-initiating group, it may be difficult to provide sufficiently accurate control of the molecular weights of the polymer chains so produced and/or the spread of molecular weights among polymer chains may be too large, with adverse effects on the properties of the polymer-coated pigment, or excessively variation between lots of the pigment. By attaching a pre-formed polymer chain directly to the pigment in a single step, the present invention allows very close control of the molecular weights of the polymer chains to provide consistent electro-optic properties and reduced variation between pigment lots.

The following Examples are now given, though by way of illustration only, to show details of preferred reagents, conditions and techniques used in the process of the present invention, and the properties of the resultant pigments.

Example 1

Ink Jet Magenta E02 (available from Clariant—1 part by weight) was added to ethyl acetate (approximately 7.8 parts by weight) and the resultant pigment dispersion was mixed under high shear and transferred to a 250 mL round bottom flask. Mono-(2,3-expoxy)propylether terminated polydimethylsiloxane, asymmetric (Gelest MCR-E21 molecular weight approximately 5000—about 1 part by weight) was added to the flask and the resultant mixture was allowed to react overnight under nitrogen at 46° C. The polymer-coated pigment was then removed from the flask, and washed and centrifuged several times to yield the final product.

The resultant pigment was dispersed in Isopar (Registered Trade Mark) G hydrocarbon fluid to produce a 15.8 percent w/v dispersion. This dispersion was diluted with additional Isopar G and 50 percent by weight (based on the weight of the pigment) of Solsperse (Registered Trade Mark) 19K charge control agent was added to produce a dispersion containing 5 percent by weight solids. The zeta potential of this dispersion was measured in a standard test cell as +21 mV; in contrast, a prior art magenta pigment produced as described in the aforementioned US 2016/0085132 using the conventional two-step process as measured as approximately +40-50 mV under the same conditions.

Example 2

Ink Jet Magenta E02 (1 part by weight) was added to ethyl acetate (approximately 7 parts by weight) and the resultant pigment dispersion was mixed under high shear and transferred to a 250 mL round bottom flask. [2-3% (epoxycyclohexylethyl)methylsiloxane]-dimethylsiloxane copolymer (Gelest ECMS-227 molecular weight approximately 18000-20000—about 1 part by weight) was added to the flask and the resultant mixture was allowed to react overnight under nitrogen at 46° C. The polymer-coated pigment was then removed from the flask, and washed and centrifuged several times to yield the final product.

The resultant pigment was dispersed in Isopar G hydrocarbon fluid to produce a 15 percent w/v dispersion. This dispersion was diluted with additional Isopar G and 50 percent by weight (based on the weight of the pigment) of Solsperse 19K charge control agent was added to produce a dispersion containing 5 percent by weight solids. The zeta potential of this dispersion was measured in a standard test cell as +22 mV.

Example 3

Color Gamut Tests

The pigment prepared in Example 1 above were formulated into multi-color electrophoretic media substantially as described in Example 13 of the aforementioned US 2016/0085132, using magenta pigments loadings of 3 and 3.5 percent by weight. A control medium was prepared using the prior art pigment used in Example 13. The media were driven at all eight colors as described in Example 13 and the average dsNAP and a maximum color gamut were calculated for each pigment. The results are shown in Table 1 below and are plotted in FIGS. 1-3.

TABLE 1

| Magenta Pigment | R | G | B | Y | C | M | W | K | Average dSNAP | Max Gamut |
|---|---|---|---|---|---|---|---|---|---|---|
| Ex. 1, 3% | 7 | 8 | 3 | 7 | 21 | 10 | 13 | 2 | 8.88 | 125551 |
| Ex. 1, 3.5% | 12 | 0 | 4 | 4 | 11 | 12 | 5 | 6 | 6.75 | 121560 |
| Control | 10 | 6 | 2 | 1 | 15 | 4 | 3 | 3 | 5.50 | 146623 |

Figure 2:
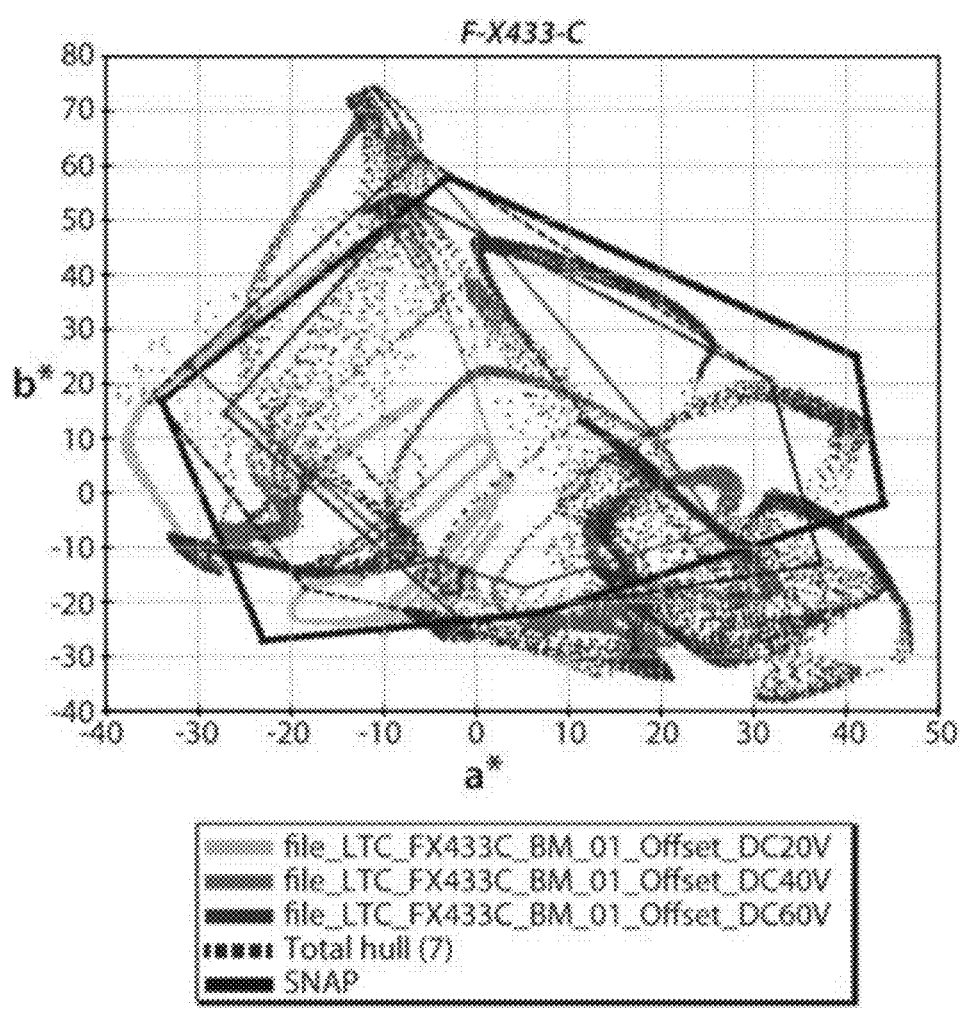
Figure 3:
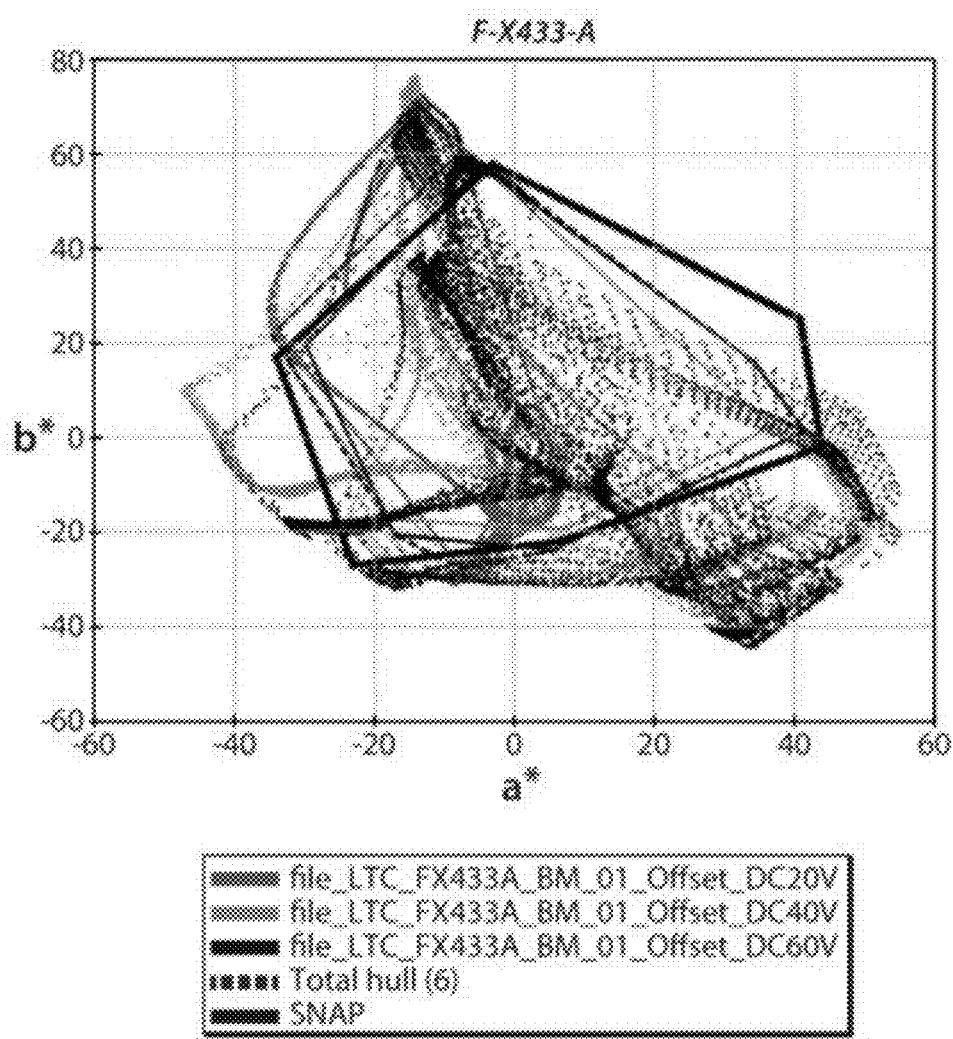

From Table 1 and FIGS. 1-3, it will be seen that both media containing a magenta pigment of the present invention gave a magenta saturation greater than that of the medium containing the prior art magenta pigment, and a comparable color gamut, even though the magenta pigment of Example 1 was used exactly as first prepared and no formulation optimization was performed.

In a second series of experiments, the pigment prepared in Example 2 above was formulated into a multi-color electrophoretic medium substantially as described in Example 13 of the aforementioned US 2016/0085132, using a magenta pigment loading of 3 percent by weight. A control medium was prepared using the prior art pigment used in Example 13. The media were driven at all eight colors as described in Example 13 and the average dsNAP and a maximum color gamut were calculated for each pigment. The results are shown in Table 2 below and are plotted in FIGS. 4 and 5.

TABLE 2

| Magenta Pigment | R | G | B | Y | C | M | W | K | Average dSNAP | Max Gamut |
|---|---|---|---|---|---|---|---|---|---|---|
| Control | 6 | 10 | 1 | 8 | 11 | 7 | 6 | 3 | 6.50 | 104207 |
| Ex. 2, 3% | 13 | 10 | 5 | 9 | 17 | 8 | 11 | 1 | 9.25 | 115953 |

Figure 4:
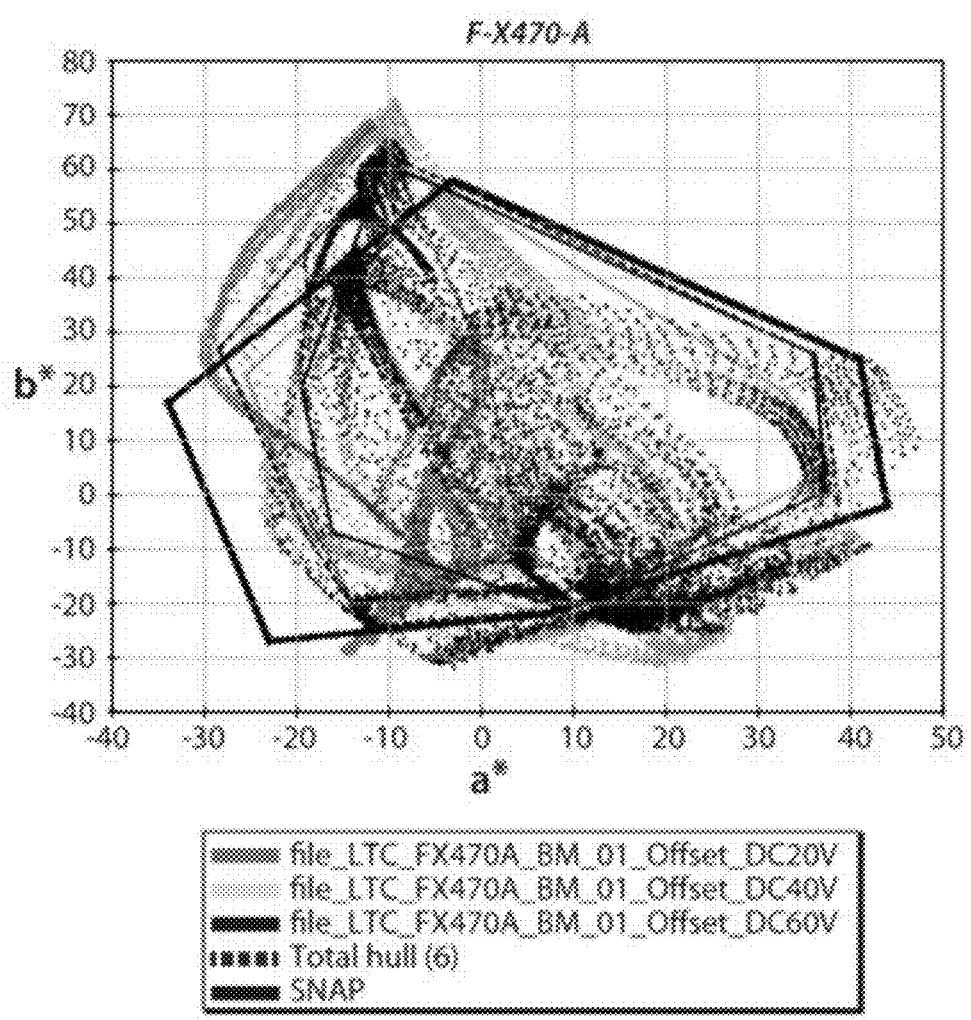
Figure 5:
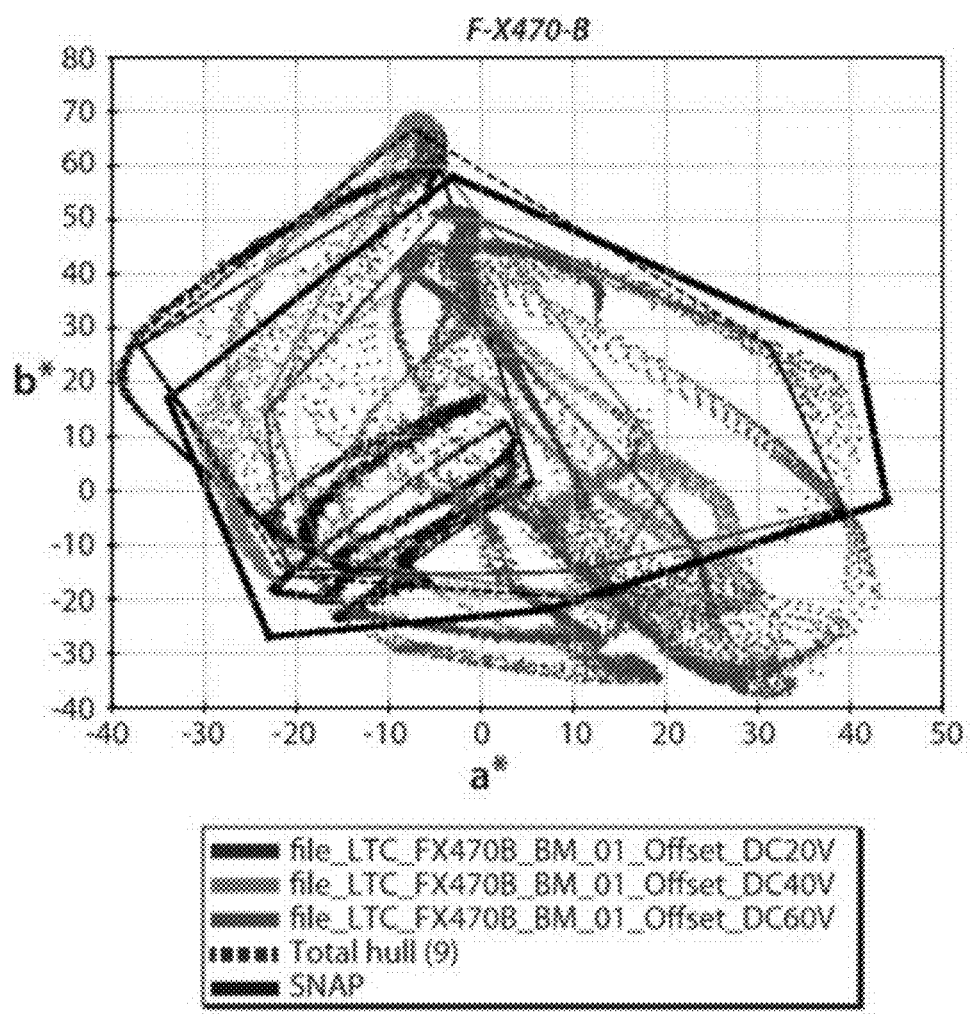

From Table 2 and FIGS. 4 and 5, it will be seen that the media containing the magenta pigment of the present invention gave a magenta saturation greater than that of the medium containing the prior art magenta pigment, and a slightly larger color gamut, even though the magenta pigment of Example 2 was used exactly as first prepared and no formulation optimization was performed.

From the foregoing, it will be seen that the present invention can provide a simple, single-step method of attaching polymer chains of varying molecular weights to quinacridone pigments. The resulting pigment sets allow fine tuning of the interaction energies of the magenta pigment with itself and with other pigments in multi-color single layer electrophoretic displays.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A quinacridone pigment comprising a polysiloxane-substituted quinacridone, in which a polysiloxane grouping is bonded to one of the quinacridone nitrogen atoms via a hydrocarbon linking group or a 3-alkoxypropyl linking group, the linking group bearing a hydroxyl group on a carbon atom β to the quinacridone nitrogen atom, the polysiloxane-substituted quinacridone being prepared by the reaction between quinacridone pigment particles and an epoxy-terminated polysiloxane in an organic solvent.

2. The quinacridone pigment of claim 1, wherein the polysiloxane-substituted quinacridone is of the formula:

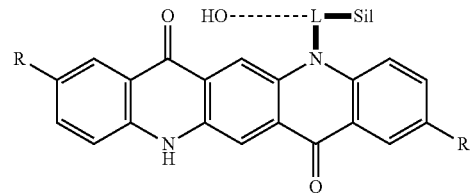

where each R independently is a hydrogen, $C_1$-$C_3$ alkyl group, or a halogen, L is a hydrocarbon linking group or a 3-alkoxypropyl linking group, Sil is a polysiloxane grouping, and the broken line indicated that the hydroxyl substituent is attached to a carbon atom β to the quinacridone nitrogen atom.

3. The quinacridone pigment of claim 2 wherein Sil represents the residue of a polydialkylsiloxane.

4. The quinacridone pigment of claim 2 wherein both R groups are methyl groups.

5. An electrophoretic medium comprising particles of a pigment according to claim 1 dispersed in a fluid.

6. The electrophoretic medium of claim 5 further comprising at least two types of pigment particles other than the quinacridone pigment particles of claim 2, the three types of pigment particles having colors differing from each other.

7. The electrophoretic medium of claim 5 further comprising, in addition to the fluid:
(a) a plurality of first and a plurality of second particles dispersed in the fluid the first and second particles bearing charges of opposite polarity, the first particle being a light-scattering particle and the second particle having one of the subtractive primary colors; and
(b) a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth types of particles is greater than that required to separate an aggregate formed from any other two types of particles.

8. The electrophoretic medium of claim 5 further comprising, in addition to the fluid:
(a) a plurality of first and a plurality of fourth particles dispersed in the fluid the first and fourth particles bearing charges of opposite polarity and each having a polymer coating comprising at least about 60 percent by weight of an acrylate or methacrylate ester monomer wherein the ester group comprises a hydrocarbon chain comprising at least about six carbon atoms, one of the first and fourth particles being a light-scattering particle and the other of the first and fourth particles being a substantially non-light-scattering particle having one of the subtractive primary colors;
(b) a plurality of second particles dispersed in the fluid, the second particles bearing charges of the same polarity as the fourth particles, having a polymer coating comprising at least about 60 percent by weight of a polydimethylsiloxane-containing monomer, and having a subtractive primary color different from the substantially non-light-scattering one of the first and fourth particles, the second particles being pigment particles of the present invention; and
(c) a plurality of third particles bearing charges of the same polarity as the first particles, being substantially non-light scattering and having a subtractive primary color different from the substantially non-light-scattering one of the first and fourth particles and different from that of the second particles.

9. An electrophoretic display comprising a layer of an electrophoretic medium according to claim 5 and at least one electrode disposed adjacent the layer of electrophoretic medium and arranged to apply an electric field thereto.

\* \* \* \* \*